Aug. 13, 1929.   J. H. HUNT   1,724,655
CARRIER FOR SPARE WHEELS
Filed April 2, 1926
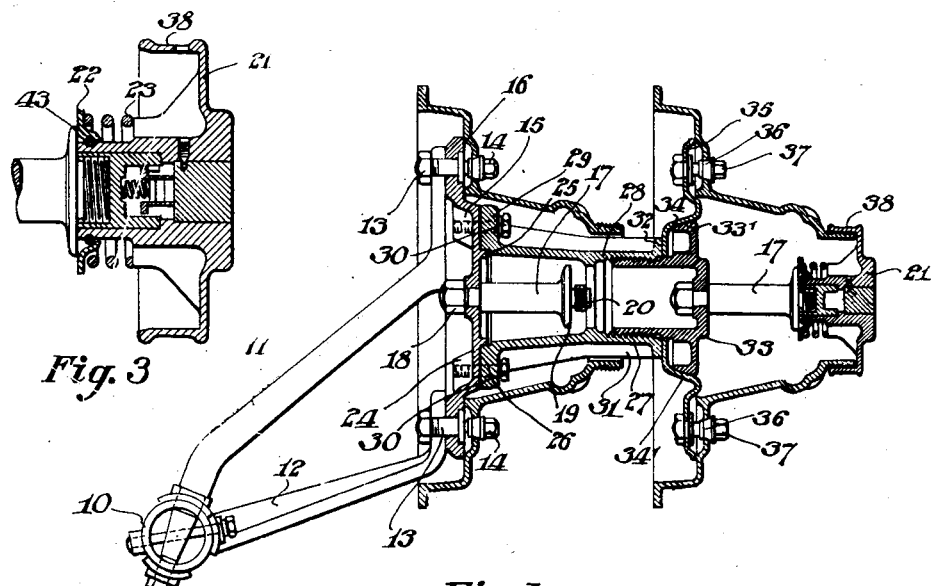
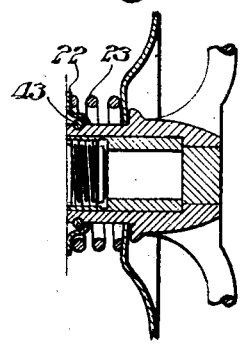
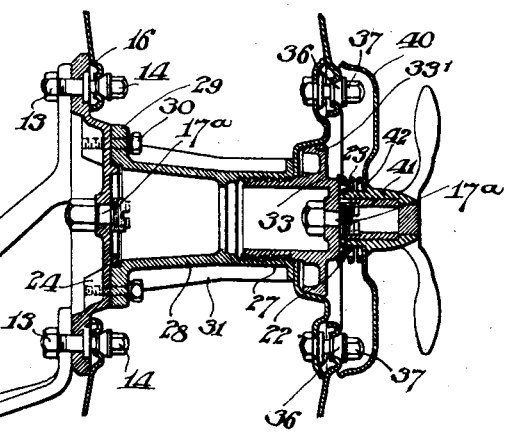
INVENTOR.
J. HAROLD HUNT
BY
John P. Tarbox
ATTORNEY.

Patented Aug. 13, 1929.

1,724,655

UNITED STATES PATENT OFFICE.

J. HAROLD HUNT, OF DETROIT, MICHIGAN, ASSIGNOR TO BUDD WHEEL COMPANY, OF PHILADELPHIA, PENNSYLVANIA, A CORPORATION OF PENNSYLVANIA.

CARRIER FOR SPARE WHEELS.

Application filed April 2, 1926. Serial No. 99,193.

The invention relates to an improved carrier for spare disc wheels or spare wire wheels adapted to be used interchangeably with disc wheels.

The main object of the invention is to provide a simple, cheap and efficient device for carrying either one or two spare disc wheels or one or two spare wire wheels on a motor car.

Another object of the invention is to provide a carrier for spare wheels which may be readily converted so as to carry either one or two spare wheels either of the disc or of the wire wheel type.

Another object of my invention is to provide a carrier capable of carrying two spare wheels which utilizes the principal parts of a single wheel carrier so that a single wheel carrier can be very quickly and conveniently converted into a dual wheel carrier.

Further objects and advantages will appear from the following description in connection with the drawings forming a part thereof.

In the drawings:

Fig. 1 shows, in a central longitudinal vertical section, the improved spare wheel carrier when utilized to carry two wire wheels.

Fig. 2 shows, in a similar section, the improved spare wheel carrier when utilized to carry two disc wheels.

Fig. 3 shows, on an enlarged scale, a sectional view of the manner of securing the protective cap used when the carrier is utilized to carry a spare wire wheel or wheels.

Fig. 4 shows in a similar view, the manner of securing the protective cap or shield used when the carrier is utilized to carry a spare disc wheel or wheels.

The carrier proper is suitably attached to the rear part of the frame of a motor car by means of a transversely extending tubular bracket member 10 and the upwardly and rearwardly extending arms 11 and 12 suitably secured at one end to the member 10 and at the other end to the carrier proper by means of the studs 13.

Since the wheels with which the present carrier is particularly adapted to be used are of the type having an annular series of holes corresponding to the number of studs by means of which they are demountably secured to a radial hub flange, the studs 13 for securing the carrier to the arms 11 and 12 are arranged so as to coincide with certain of these holes and together with the cap nuts 14 they are utilized to secure, either a disc wheel or a wire wheel of the type shown to the carrier. Obviously any holes remaining unoccupied by the studs 13 can be provided, if desired, with additional short studs, not shown, extending through and secured to the base support 15 of the carrier.

The base support 15 of the carrier is provided with an annular seat 16 against which either a wire or a disc wheel is adapted to be clamped by the securing studs and cap nuts in the manner clearly shown in the drawings.

If the carrier is to be used to carry a single wheel, outside of the protective means or cover and the securing rims therefor now to be described nothing further is required. At its center the base support is provided, in the case where it is to be used in mounting a wire wheel, which has an elongated outer hub shell, with an elongated stud 17 which has its rear portion of reduced diameter extend through a hole in the base support and, to clamp the stud in position, the screw threaded end of this reduced portion receives a nut 18. The forward end of the stud is provided with a collar 19 and in front of this collar with a screw-threaded extension 20. When provision is to be made for mounting only one spare wire wheel, the protective cap or cover 21 is screwed on to this extension 20. Suitable locking means, which form no part of the present invention, and are therefore not specifically described, normally prevent removal of the protective cap. A washer 22 and spring 23 serve to prevent rattling of cover cap 21 and also tend to prevent accidental unscrewing of the cap. The washer and spring are retained on the cap 21 by a split locking ring 43 seated in a corresponding recess, semi-circular in cross-section on the cap member 21.

Within the annular seat against which the spare wheel is clamped the base support 15 is formed with a rearwardly projecting boss 24 having, between a central annular rearwardly projecting flange 25 and the periphery of the boss, an annular seat 26 which is machined to receive an extension support 27 for a second spare wheel.

This extension support 27 may consist, as shown, of a casting 28 having a radial flange 29 at its inner end adapted to be seated on the seat 26 of the base support 15 and detachably secured thereto by suitable means, such as a plurality of studs 30. The casting 28 may be reinforced and strengthened by longitudinal ribs 31 extending from the base flange 28 to a flange 32 at its outer end.

The casting 28 is hollow, and receives at its rear portion the stud 17 used for securing the protective cap when the carrier is adapted to carry but a single wheel. At its outer end the casting 30 is internally screw-threaded, and adapted to receive the screw threaded inner end of a clamping member 33. Between the clamping member 33 and the flange 32 at the outer end of the casting 30, there is secured an annular seating member 34, preferably pressed out of sheet metal and having the irregular cross-sectional contour clearly shown in the drawings. The irregular contour serves to stiffen and strengthen the thin sheet metal member 34. Furthermore, the intermediate portion $34^1$ of the member 34 provides a relatively wide functure conical seat coacting with a corresponding peripheral surface $33^1$ peripheral surface on the clamping member 33 to center. The member 34 and support it adequately against radial thrusts.

This seating member 34 has a seat 35 adjacent its periphery adapted to receive the second wire or disc wheel, as the case may be, and the wheel is secured to this seat by studs 36 and 37 cooperating with the usual holes provided in the wheel for securing it to the hub flange.

Centrally the clamping member 33 carries a stud 17 similar to the one carried by the base support 15. This stud receives the protective cap 21 secured thereto in the manner above described. It will be noted that this cap has an inwardly extending flange 38 at its periphery which shields and protects the screw threads at the outer end of the wheel hub shell. This cap also serves to lock the wheels in place and provides a pleasing appearance.

In the carrier adapted for disc wheels, as shown in Fig. 2, the construction is substantially the same as that hereinbefore described except in the protective cap or shield and the means for securing it in position.

The studs $17^a$ are similar to studs 17 used in connection with the wire wheels, except that they are very short and the screw threaded portions are directly adjacent the outer face of the supports 14 and clamping member 23.

In this case, the protective cap or cover consists of a dished sheet metal stamping 40 extending outwardly beyond the cap nuts to cover and secure them against loss, should they become loosened from any cause; and also to present a pleasing appearance. A central opening in the dished cover 40 fits loosely over the reduced inner end of a nut 41 and is pressed against a shoulder 42 on the nut by a spring 23 acting at its other end against a washer 22. The spring and washer serve, when the nut 41 is in place, to prevent rattling of the cover cap 40 and tend to prevent accidental loosening thereof in a manner similar to the action of the washer 22 and spring 23 used in connection with the wire wheel protective and cover cap 21. The specific construction of the nut 41 whereby it may be locked against removal is not a part of this invention and need not be here described.

From the foregoing description it will be apparent that the novel improved carrier can be readily converted from a single to a dual wheel carrier adapted for either wire or disc wheels by simply securing to or removing from the base support 15, the extension support 27. This can be readily done through manipulation of the securing studs 29. In securing the extension support 27, it is centered on the base support 15 by means of the rearwardly projecting annular flange 25.

Also, by the novel improved construction, one and the same cover plate or protective cap can be used for either single or dual wheel carriers thereby simplyfying the manufacture and permitting the carrying of a minimum of extra parts. The extension support 27, exclusive of the protective cap, and the securing means therefor, are the only parts required to convert the carrier from a carrier for single wheels to a carrier for dual wheels. To convert from a dual carrier for disc wheels to a dual carrier for wire wheels the only parts which need to be changed are the protective caps and the studs and nuts for securing them in place.

What I claim and desire to secure by Letters Patent is:

1. A carrier for spare wheels comprising a base support providing a seat adapted to receive a spare wheel, means for securing said wheel on said seat, an extension support demountably secured to said base support and providing a seat for an additional spare wheel, means for securing said additional wheel to its seat, a shielding element, and means for securing the same alternatively to said extension support or to said base support when this extension support has been demounted.

2. In a carrier for spare wheels, the combination of a base support adapted to carry one wheel, and an extension support adapted to carry a second wheel secured to said base support, said extension support comprising a wheel seating element, and means for removably clamping said wheel seating element in position.

3. In a carrier for spare wheels, the combination of a base support adapted to carry one wheel, and an extension support secured to the base support and adapted to carry a second wheel, said extension support comprising an annular pressed-metal wheel seating element and clamping members to secure said element firmly in position.

4. In a carrier for spare wheels, the combination of a base support adapted to carry one wheel, and an extension support detachably secured to said base support and adapted to carry a second wheel, the attachment of the extension support to the base support being independent of the attachment of the first-mentioned wheel to the base support.

5. In a carrier for spare wheels, a wheel support comprising a pair of clamping elements, and a disc shaped wheel-carrying member adapted to be clamped between said elements, and having an intermediate frustro-conical seat fitting a corresponding peripheral seat on one of said clamping elements.

6. In a carrier for spare wheels, a wheel support comprising a pair of clamping elements, and a disc-shaped wheel carrying member adapted to be clamped between said elements and having an intermediate frustro-conical seat fitting a corresponding peripheral seat on one of said clamping elements, and an outer peripheral seat for securing a wheel thereto, said outer peripheral seat and the interfitting frustro-conical seat being in substantially the same radial plane.

7. A carrier for spare wheels comprising a base support having an annular series of wheel securing means through which a disc wheel may be secured in place, and an extension support for a second wheel in tandem therewith and facing in the same direction independent of the securing means for the first named wheel.

8. A spare wheel carrier comprising a base support having thereon securing means to hold one spare wheel in place, and an extension support for a second wheel in tandem with the first wheel and facing in the same direction secured to the first named support independently of securement of and connection with the first named wheel.

9. A spare wheel carrier comprising a base support of substantial plane form having an annular series of securing means for a disc wheel, and an extension support for a second wheel independent of the said securing means and removably connected with the first named support substantially in the plane of its base.

In testimony whereof I hereunto affix my signature.

J. HAROLD HUNT.